United States Patent
Wijffels et al.

(10) Patent No.: US 10,821,947 B2
(45) Date of Patent: Nov. 3, 2020

(54) DRIVING ADJUSTMENT FOR VEHICLE LOADING

(71) Applicant: Ford Global Technologies, LLC, Dearborn, MI (US)

(72) Inventors: Lodewijk Wijffels, Northville, MI (US); Devon Eyerman, Plymouth, MI (US); Joshua Guerra, Farmington Hills, MI (US); Sagar Avaneendra Tatipamula, Canton, MI (US); Ashrit Das, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 16/150,468

(22) Filed: Oct. 3, 2018

(65) Prior Publication Data

US 2020/0108811 A1     Apr. 9, 2020

(51) Int. Cl.

| | |
|---|---|
| *B60T 8/1755* | (2006.01) |
| *B60T 8/24* | (2006.01) |
| *B60W 40/13* | (2012.01) |
| *G01G 19/08* | (2006.01) |
| *B60W 50/04* | (2006.01) |

(Continued)

(52) U.S. Cl.
CPC ......... *B60T 8/17551* (2013.01); *B60W 40/13* (2013.01); *G01G 19/086* (2013.01); *B60G 2400/61* (2013.01); *B60T 8/241* (2013.01); *B60T 2250/02* (2013.01); *B60W 10/04* (2013.01); *B60W 10/18* (2013.01); *B60W 10/20* (2013.01); *B60W 30/025* (2013.01); *B60W 2040/1307* (2013.01); *B60W 2040/1315* (2013.01); *B60W 2050/046* (2013.01); *B60W 2420/42* (2013.01); *B60W 2420/52* (2013.01); *B60W 2520/18* (2013.01)

(58) Field of Classification Search
None
See application file for complete search history.

(56) References Cited

U.S. PATENT DOCUMENTS

| | | | |
|---|---|---|---|
| 8,798,887 B2 * | 8/2014 | Nickolaou | ............ B60W 40/13 701/70 |
| 9,290,165 B2 | 3/2016 | Messih et al. | |

(Continued)

FOREIGN PATENT DOCUMENTS

DE     102009057625 A1     6/2011

OTHER PUBLICATIONS

Reineh, et al., "IMU-Based Vehicle Load Estimation Under Normal Driving Conditions", published in 53rd IEEE Conference on Decision and Control, Dec. 15-17, 2014, Los Angeles, CA (2 pages).

*Primary Examiner* — Abdhesh K Jha
(74) *Attorney, Agent, or Firm* — Frank A. MacKenzie; Bejin Bieneman PLC (57) ABSTRACT

A computer includes a processor and a memory storing instructions executable by the processor to determine at least one of a vehicle pitch or a longitudinal center of gravity from data measured while deactivating a first brake for a first axle and applying a second brake for a second axle, and operate the vehicle based on the at least one of vehicle pitch or longitudinal center of gravity. The instructions may further include to determine a vehicle weight from the data, and operate the vehicle based on the vehicle weight.

18 Claims, 4 Drawing Sheets

(51) Int. Cl.
    *B60W 10/04*    (2006.01)
    *B60W 10/18*    (2012.01)
    *B60W 10/20*    (2006.01)
    *B60W 30/02*    (2012.01)

(56) References Cited

U.S. PATENT DOCUMENTS

| | | | |
|---|---|---|---|
| 9,956,965 B1* | 5/2018 | Hall | B60W 10/10 |
| 2007/0129867 A1* | 6/2007 | Huang | B60W 40/12 |
| | | | 701/124 |
| 2014/0012468 A1* | 1/2014 | Le | G06F 11/30 |
| | | | 701/38 |
| 2014/0278040 A1* | 9/2014 | Singh | G01M 17/06 |
| | | | 701/124 |
| 2014/0316637 A1* | 10/2014 | Rhode | B60G 17/017 |
| | | | 701/29.1 |
| 2014/0350787 A1* | 11/2014 | Swanson | B60G 17/017 |
| | | | 701/38 |
| 2016/0214504 A1* | 7/2016 | Park | B60L 15/20 |
| 2016/0214620 A1 | 7/2016 | Yang | |
| 2016/0368493 A1 | 12/2016 | Driscoll et al. | |
| 2018/0039283 A1 | 2/2018 | Srivastava | |
| 2018/0170396 A1* | 6/2018 | Burnette | B60W 10/184 |
| 2018/0178810 A1* | 6/2018 | Hall | B60W 40/13 |
| 2018/0194357 A1* | 7/2018 | Hall | G07C 5/0808 |

\* cited by examiner

DRIVING ADJUSTMENT FOR VEHICLE LOADING

BACKGROUND

The weight and weight distribution of a vehicle affect the handling of the vehicle, and changes to the weight and weight distribution cause changes to the handling. Changes to the weight and weight distribution of the vehicle can occur by loading or unloading occupants and cargo. Increased weight can slow down acceleration and increase stopping distance. Adjusting the weight distribution forward in the vehicle increases the braking effectiveness of the front-axle brakes and reduces the braking effectiveness of the rear-axle brakes, and vice versa.

DETAILED DESCRIPTION

The system described herein can improve the motion performance and handling of an autonomous vehicle. The system can improve vehicle operations such as acceleration, turning comfort, relative braking force between axles, etc. by optimizing the operations for the vehicle pitch, weight, and/or longitudinal center of gravity. The vehicle can therefore provide a smoother, more enjoyable ride for occupants.

A computer includes a processor, and a memory storing instructions executable by the processor to determine at least one of a vehicle pitch or a longitudinal center of gravity from data measured while deactivating a first brake for a first axle and applying a second brake for a second axle, and operate the vehicle based on the at least one of vehicle pitch or longitudinal center of gravity.

The instructions may further include to determine a vehicle weight from the data, and operate the vehicle based on the vehicle weight.

The instructions may further include to determine the vehicle pitch and the longitudinal center of gravity from the data, and operate the vehicle based on the vehicle pitch and the longitudinal center of gravity.

Operating the vehicle based on the at least one of vehicle pitch or longitudinal center of gravity may include steering the vehicle.

Operating the vehicle based on the at least one of vehicle pitch or longitudinal center of gravity may include selecting relative braking forces for the first brake and second brake to apply.

Measuring the data may occur in response to the vehicle stopping.

The data may be second data, and the instructions may further include to measure first data while deactivating the first brake and applying the second brake, then apply the first brake before measuring the second data, and then determine the at least one of vehicle pitch or longitudinal center of gravity from the first data and the second data. Measuring the second data may occur in response to detecting a vehicle pitch change above a threshold.

Measuring the second data may occur in response to detecting at least one of a vehicle door closing or a vehicle seatbelt buckling.

A method includes determining at least one of a vehicle pitch or a longitudinal center of gravity from data measured while deactivating a first brake for a first axle and applying a second brake for a second axle, and operating the vehicle based on the at least one of vehicle pitch or longitudinal center of gravity.

The method may further include determining a vehicle weight from the data, and operating the vehicle based on the vehicle weight.

The method may further include determining the vehicle pitch and the longitudinal center of gravity from the data, and operating the vehicle based on the vehicle pitch and the longitudinal center of gravity.

Operating the vehicle based on the at least one of vehicle pitch or longitudinal center of gravity may include steering the vehicle.

Operating the vehicle based on the at least one of vehicle pitch or longitudinal center of gravity may include selecting relative braking forces for the first brake and second brake to apply.

Measuring the data may occur in response to the vehicle stopping.

The data may be second data, and the method may further include measuring first data while deactivating the first brake and applying the second brake, then applying the first brake before measuring the second data, and then determining the at least one of vehicle pitch or longitudinal center of gravity from the first data and the second data. Measuring the second data may occur in response to detecting a vehicle pitch change above a threshold.

Measuring the second data may occur in response to detecting at least one of a vehicle door closing or a vehicle seatbelt buckling.

With reference to the Figures, a computer 30 includes a processor and a memory storing instructions executable by the processor to determine at least one of a vehicle pitch or a longitudinal center of gravity from data measured while deactivating a first brake 34 for a first axle 36 and applying a second brake 38 for a second axle 40, and operate the vehicle 32 based on the at least one of vehicle pitch or longitudinal center of gravity.

Figure 1:
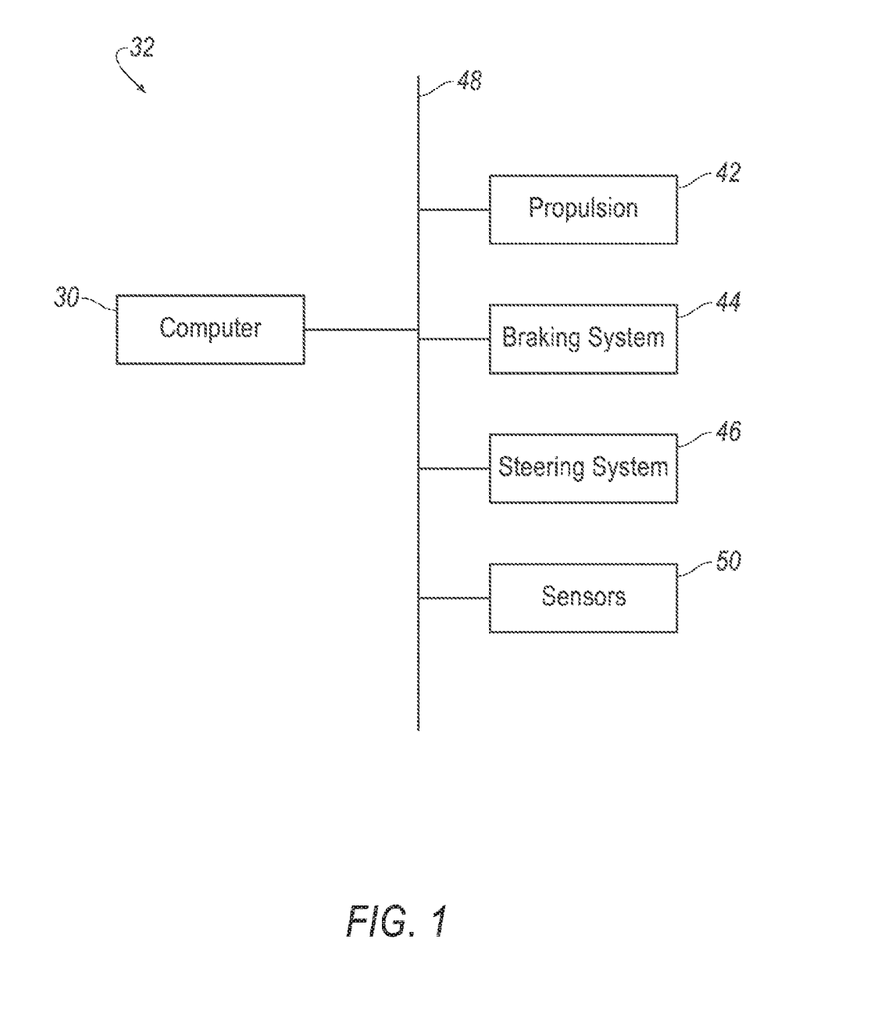
FIG. 1 is a block diagram of an example vehicle.
Figure 2:
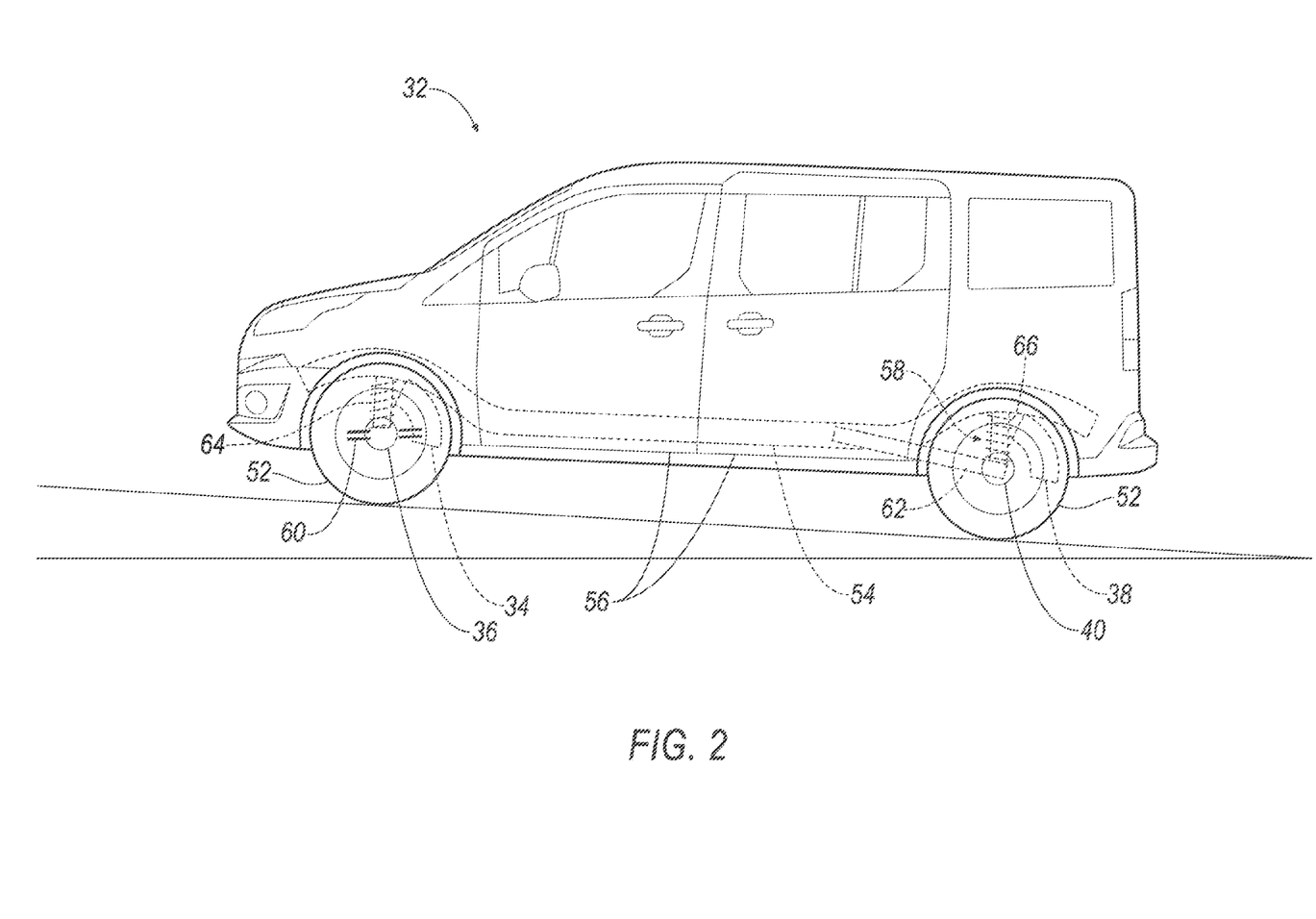
FIG. 2 is a side view of the vehicle of FIG. 1.
Figure 3:
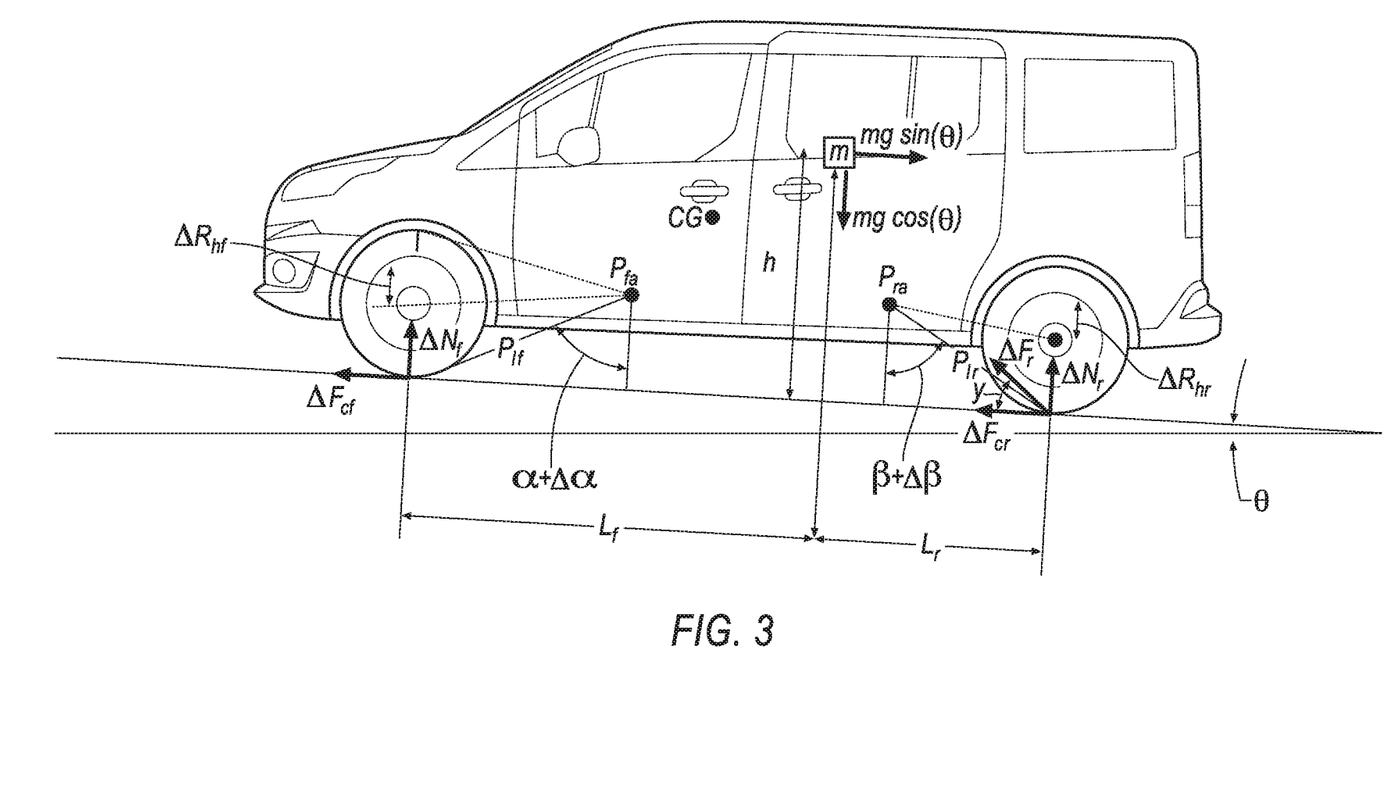
FIG. 3 is a side view of the vehicle of FIG. 1 with a kinematic diagram illustrating a change in vehicle pitch.

With reference to FIG. 1, the vehicle 32 may be any passenger or commercial automobile such as a car, a truck, a sport utility vehicle, a crossover, a van (as shown in FIGS. 2 and 3), a minivan, a taxi, a bus, etc.

The vehicle 32 may be an autonomous vehicle. The computer 30 can be programmed to operate the vehicle 32 independently of the intervention of a human driver, completely or to a lesser degree. The computer 30 may be programmed to operate a propulsion 42, brake system 44, steering system 46, and/or other vehicle systems. For the purposes of this disclosure, autonomous operation means the computer 30 controls the propulsion 42, brake system 44, and steering system 46 without input from a human driver; semi-autonomous operation means the computer 30 controls one or two of the propulsion 42, brake system 44, and steering system 46 and a human driver controls the remainder; and nonautonomous operation means a human driver controls the propulsion 42, brake system 44, and steering system 46.

The computer 30 is a microprocessor-based controller. The computer 30 includes a processor, memory, etc. The memory of the computer 30 includes memory for storing instructions executable by the processor as well as for electronically storing data and/or databases. The computer 30 may be a single computer or may be multiple computers in communication with each other.

The computer 30 may transmit and receive data through a communications network 48 such as a controller area network (CAN) bus, Ethernet, WiFi, Local Interconnect Network (LIN), onboard diagnostics connector (OBD-II), and/or by any other wired or wireless communications network. The computer 30 may be communicatively coupled to the propulsion 42, the brake system 44 includes the brakes 34, 38, the steering system 46, sensors 50, and other components via the communications network 48.

The propulsion 42 of the vehicle 32 generates energy and translates the energy into motion of the vehicle 32. The propulsion 42 may be a known vehicle propulsion subsystem, for example, a conventional powertrain including an internal-combustion engine coupled to a transmission that transfers rotational motion to wheels 52; an electric powertrain including batteries, an electric motor, and a transmission that transfers rotational motion to the wheels 52; a hybrid powertrain including elements of the conventional powertrain and the electric powertrain; or any other type of propulsion. The propulsion 42 can include an electronic control unit (ECU) or the like that is in communication with and receives input from the computer 30 and/or a human driver. The human driver may control the propulsion 42 via, e.g., an accelerator pedal and/or a gear-shift lever.

The steering system 46 is typically a conventional vehicle steering subsystem and controls the turning of the wheels 52. The steering system 46 may be a rack-and-pinion system with electric power-assisted steering, a steer-by-wire system, as both are known, or any other suitable system. The steering system 46 can include an electronic control unit (ECU) or the like that is in communication with and receives input from the computer 30 and/or a human driver. The steering system 52 may be applied to front wheels 52, or alternatively or additionally to rear wheels 52. The human driver may control the steering system 46 via, e.g., a steering wheel.

The brake system 44 is typically a conventional vehicle braking subsystem and resists the motion of the vehicle 32 to thereby slow and/or stop the vehicle 32. The brake system 44 includes the first brake 34 and the second brake 38. The first and second brakes 34, 38 may be friction brakes, regenerative brakes, any other suitable type of brakes, or a combination. Friction brakes provide stopping power through friction between a component rotating with the wheel and a component stationary relative to the vehicle 32. Friction brakes may be disc brakes, drum brakes, band brakes, or any other suitable type of brake. Regenerative brakes transform the kinetic energy of the vehicle 32 into energy stored in a battery pack. Regenerative brakes are an electric motor that may be the same electric motor as in the hybrid powertrain, or an additional electric motor coupled to the wheels 52. Regenerative brakes operate as generators, into which the forward rotational motion of the wheels 52 provides an input. By reversing the direction of the torque on, for example, the electric motor to resist the motion of the wheels 52, the electric motor functions as an electrical generator instead of as a motor, and the electric motor absorbs the kinetic energy of the vehicle 32 through the torque and motion of the wheels 52. The brake system 44 can include an electronic control unit (ECU) or the like that is in communication with and receives input from the computer 30 and/or a human driver. The human driver may control the brake system 44 via, e.g., a brake pedal.

The sensors 50 may provide data about operation of the vehicle 32, for example, wheel speed, wheel orientation, and engine and transmission data (e.g., temperature, fuel consumption, etc.). The sensors 50 may detect the location of the vehicle 32, e.g., global positioning system (GPS) sensors, longitudinal and/or lateral accelerometers such as piezo-electric or microelectromechanical systems (MEMS), etc. The sensors 50 may directly or indirectly detect the orientation of the vehicle 32. For example, the sensors 50 may include gyroscopes such as rate, ring laser, or fiber-optic gyroscopes; inertial measurements units (IMU); magnetometers; inclinometers; and ride-height sensors. Ride-height sensors 50 are travel sensors that detect an extension distance of suspension springs of the vehicle 32, e.g., capacitive transducers, capacitive displacement sensors, eddy-current sensors, ultrasonic sensors, Hall effect sensors, inductive noncontact position sensors, linear variable differential transformers, piezoelectric transducers, potentiometers, linear coders, string potentiometers, etc. The sensors 50 may detect a status of occupants of the vehicle 32, such as with occupancy sensors or door sensors. Occupancy sensors 50 may be visible-light or infrared cameras directed at the seats, weight sensors inside the seats, sensors detecting whether seatbelts for the seats are buckled or unspooled, or other suitable sensors. Door sensors 50 may detect whether doors 56 of the vehicle 32 are open or closed, as are known. The sensors 50 may detect the external world, e.g., objects and/or characteristics of surroundings of the vehicle 32, such as other vehicles, road lane markings, traffic lights and/or signs, pedestrians, etc. For example, the sensors 50 may include radar sensors, scanning laser range finders, light detection and ranging (LIDAR) devices, and image processing sensors such as cameras. The sensors 50 may include communications devices, for example, vehicle-to-infrastructure (V2I) or vehicle-to-vehicle (V2V) devices.

With reference to FIG. 2, the first and second axles 36, 40 are rotating shafts for transferring motion to the wheels 52. Each of the first and second axles 36, 40 is connected to a lateral pair of left and right wheels 52; alternatively for two- or three-wheeled vehicles, each of the first and second axles 36, 40 may be connected to one wheel 52. The axles 36, 40 may be fixed to and rotate with the wheels 52, in which case the axles 36, 40 may be free to rotate relative to a chassis 54 of the vehicle 32 or may be powered by the propulsion 42. Alternatively, the axles 36, 40 may be rotationally fixed relative to the chassis 54 with the wheels 52 rotating around the axles 36, 40, in which case the wheels 52 may be free to rotate relative to the respective axles 36, 40 or may be powered by the propulsion 42. The first axle 36 may be a front axle, and the second axle 40 may be a rear axle, or vice versa. The axles 36, 40 may be any suitable type, e.g., rear axles such as semi-floating, three-quarters floating, full floating, etc.; steering axles such as an I-beam, tubular, center-point steering, etc.; or any other type.

The first brake 34 is for the first axle 36, i.e., when applied, the first brake 34 slows the wheels 52 operably connected to the first axle 36. The second brake 38 is for the second axle 40, i.e., when applied, the second brake 38 slows the wheels 52 operably connected to the second axle 40. Multiple first brakes 34 may be provided for the first axle 36, and multiple second brakes 38 may be provided for the second axle 40, e.g., one for each of the wheels 52.

The vehicle 32 includes a suspension system 58. The suspension system 58 is coupled to the chassis 54 and to each axle 36, 40. The suspension system 58 absorbs and dampens shocks and vibrations from the wheels 52 to the chassis 54. For each of the left and right side of the vehicle 32, the suspension system 58 includes a first suspension arm 60 rotatably coupled to the chassis 54 and to the first axle 36, a second suspension arm 62 rotatably coupled to the chassis 54 and to the second axle 40, a first suspension spring 64 coupled to the chassis 54 and the first axle 36, a second suspension spring 66 coupled to the chassis 54 and the second axle 40, and shock absorbers (not shown). The suspension arms 60, 62 may have any geometry permitting upward movement of the wheels 52 in response to shocks. For example, as shown in FIG. 2, the first suspension arm 60 is part of a MacPherson suspension and extends laterally from the chassis 54, and the second suspension arm 62 is a trailing arm extending longitudinally from the chassis 54.

With reference to FIGS. 2 and 3, the suspension system 58 is arranged so that an upward motion of one of the axles 36, 40, such as when the wheel 52 hits a bump while the vehicle 32 is in motion, compresses the respective suspension spring 64, 66 and the respective shock absorber, causing the respective axle 36, 40 to rotate about a respective pitch axis $P_{fa}$, $P_{ra}$ relative to the chassis 54. The pitch axes $P_{fa}$, $P_{ra}$ are laterally extending axes about which the axles 36, 40 rotate relative to the chassis 54, and the pitch axes $P_{fa}$, $P_{ra}$ may be real or virtual. For example, the first pitch axis $P_{fa}$ defined by the front suspension arm 60 is virtual, and the second pitch axis $P_{ra}$ defined by the second suspension arm 62 is real, i.e., passes through where the second suspension arm 62 is rotatably coupled to the chassis 54. The suspension springs 64, 66 may exert a force that is a function, e.g., a linear relation, of a difference between the current length of the suspension spring 64, 66 and a relaxed length of the suspension spring 64, 66, taking into account all the suspension springs 64, 66 coupled to the respective axle 36, 40. The shock absorber may exert a force that is a function of a speed of compression or extension of the shock absorber.

FIG. 3 is a kinematic diagram of the vehicle 32 with a mass m loaded into the vehicle 32. The vehicle 32 is parked on an incline of angle θ. There is a longitudinal distance L between the axles 36, 40, of which $L_f$ is a longitudinal distance from the first axle 36 to the mass m and $L_r$ is a longitudinal distance from the second axle 40 to the mass m. The mass m is loaded at a height h. The changes to the forces at the contact patch of the front wheel 52 from the addition of the mass m include a normal force $\Delta N_f$ and a frictional force $\Delta F_{cf}$. The changes to the forces at the contact patch of the rear wheel 52 from the addition of the mass m include a normal force $\Delta N_r$ and a frictional force $\Delta F_{cr}$, which combine to a total force $\Delta F_r$ at an angle γ from the ground. The addition of the mass m causes changes in ride height $\Delta R_{hf}$ at the first axle 36 and $\Delta R_{hr}$ at the second axle 40. The distance from the first pitch axis $P_{fa}$ to the contact patch of the front wheel 52 is $P_{lf}$ and from the second pitch axis $P_{ra}$ to the contact patch of the rear wheel 52 is $P_{lr}$. The angle from the first pitch axis $P_{fa}$ between perpendicular to ground and the contact patch of the front wheel 52 changes from α to α+Δα due to the addition of the mass m. The angle from the second pitch axis $P_{ra}$ between perpendicular to ground and the contact patch of the rear wheel 52 changes from β to β+Δβ due to the addition of the mass m. The angles are measured in radians. The first pitch axis $P_{fa}$ has an effective rotational torque constant $K_f$, and the second pitch axis $P_{ra}$ has an effective rotational torque constant $K_r$. The center of gravity of the vehicle 32 is denoted CG.

The sensors 50 can detect the orientation of the vehicle 32, e.g., a pitch of the vehicle 32. For the purposes of this disclosure, "pitch" is defined as forward or rearward rotation of the vehicle 32, i.e., rotation about a lateral axis. Pitch may be measured relative to a level surface (i.e., relative to the direction of gravity), relative to the surface on which the vehicle 32 is sitting (i.e., the ground), or relative to a previous pitch of the vehicle 32. For example, an inclinometer or gyroscope can detect a pitch of the vehicle 32 relative to a level surface. For another example, comparison of the ride-height sensors 50 for the first axle 36 and for the second axle 40 can detect pitch relative to the surface on which the vehicle 32 is sitting.

Figure 4:
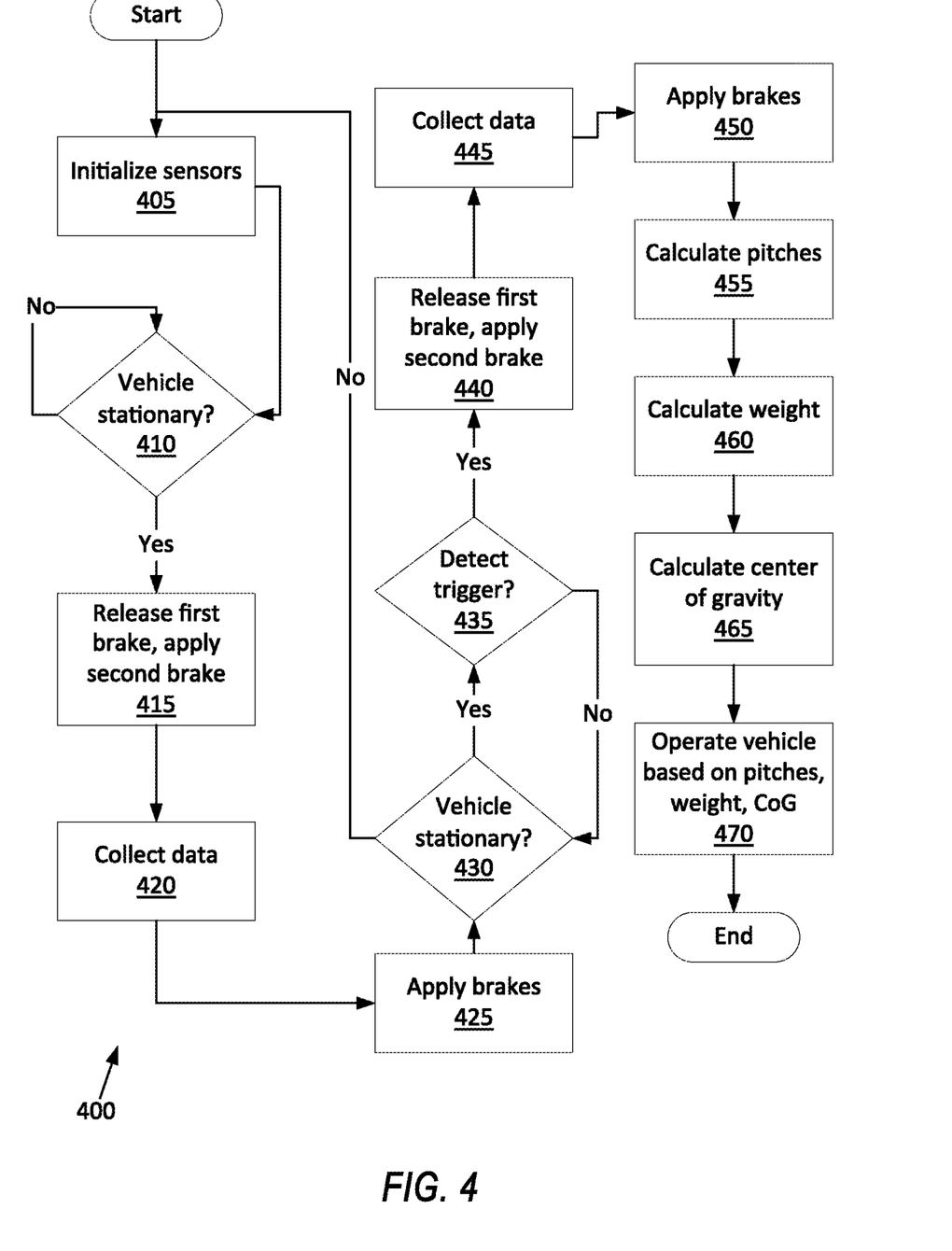
FIG. 4 is a process flow diagram of an example process for determining the weight and center of gravity of the vehicle of FIG. 1.

FIG. 4 is a process flow diagram illustrating an exemplary process 400 for determining the pitch, weight, and center of gravity CG of the vehicle 32 and operating the vehicle 32 accordingly. The memory of the computer 30 stores executable instructions for performing the steps of the process 400. In general in the process 400, the computer 30 collects data from the sensors 50 while releasing the first brake 34 and applying the second brake 38 before and after a trigger; calculates the pitch, weight, and center of gravity CG based on the collected data; and operates the vehicle 32 based on the pitch, weight, and center of gravity CG. The trigger is some change in sensor data indicating a likelihood that the pitch, weight, or center of gravity CG have changed, as described in more detail below.

The process 400 begins in a block 405, in which the computer 30 initializes the sensors 50. The computer 30 may wake up the sensors 50 and load software for interacting with the sensors 50. The computer 30 may initialize the sensors 50 in the process of starting the vehicle 32.

Next, in a decision block 410, the computer 30 determines whether the vehicle 32 is moving or stationary, i.e., has stopped. As long as the vehicle 32 is moving, the process 400 returns to the decision block 410.

In response to the vehicle 32 stopping, next, in a block 415, the computer 30 deactivates the first brake 34 and applies the second brake 38. The computer 30 releases, i.e., deactivates, the first brake 34 and maintains application of the second brake 38. The computer 32 may increase the force of the second brake 38 to compensate for the lack of the first brake 34. Because the first axle 36 is free to rotate without the first brake 34 applied, the chassis 54 of the vehicle 32 is relaxed, i.e., not under tension or compression applied by the axles 36, 40.

Next, in a block 420, the computer 30 collects first data from the sensors 50. The first data from the sensors 50 may include direct measurements of the pitch such as from an inclinometer, travel of the first suspension spring 64, travel of the second suspension spring 66, etc. With one of the axles 36, 40 free, the chassis 54 of the vehicle 32 is not under longitudinal tension or compression, which could affect data gathered from the sensors 50.

Next, in a block 425, the computer 30 applies both brakes 34, 38, in this case by applying the second brake 38 while maintaining the application of the first brake 34. Both the first brake 34 and the second brake 38 are now applied, so both axles 36, 40 are prevented from rolling.

Next, in a decision block 430, the computer 30 determines whether the vehicle 32 is moving or stationary, i.e., has stopped. If the vehicle 32 is no longer stationary, the process 400 restarts.

Next, if the vehicle 32 is still stationary, in a decision block 435, the computer 30 determines whether a trigger has occurred. The trigger is some change in data from the sensors 50 indicating a likelihood that the pitch, the weight, or the center of gravity CG has changed. For example, the sensors 50 may detect a vehicle pitch change above a threshold. The threshold may be chosen to be below pitch changes resulting from loading or unloading the vehicle 32 with cargo or occupants but above accidental perturbations such as rocking from wind. The vehicle pitch may be measured directly or may be calculated as described below with respect to the block 455. For another example, the sensors 50 may detect one of the doors 56 of the vehicle 32 closing, such as the last open door 56 closing so that all the doors 56 are closed. For another example, the sensors 50 may detect a seatbelt buckling, such as a seatbelt buckling without any later seatbelt bucklings for a period of time. The period of time may be chosen to give all occupants of the vehicle 32 an opportunity to board the vehicle 32. For another example, an operator may transmit a message to the computer 30 indicating that loading or unloading of the vehicle 32 has occurred and is now complete. As long as none of the triggers have occurred, the process 400 returns to the decision block 430. In other words, the computer 30 waits for a trigger for as long as the vehicle remains stationary.

In response to one of the triggers being detected, next, in a block 440, the computer 30 deactivates the first brake 34 and applies the second brake 38, as described above with respect to the block 415.

Next, in a block 475, the computer 30 collects second data from the sensors 50, as described above with respect to the block 420 for the first data.

Next, in a block 450, the computer 30 applies both brakes 34, 38, as described above with respect to the block 425.

Next, in a block 455, the computer 30 calculates a first pitch and a second pitch. The first pitch is the vehicle pitch with one of the axles 36, 40 freely rotatable before the trigger, and the computer 30 determines the first pitch based on the first data. For example, the first pitch may be a direct measurement from the inclinometer in the first data. For another example, the first pitch may be based on a difference in position changes of the ride-height sensors 50 from baseline positions.

The baseline positions of the ride-height sensors may be their positions when the vehicle 32 is carrying no occupants or cargo, and the baseline positions may be prestored in the memory of the computer 30. For another example, the first pitch may be determined based on a change in ride height from a previously measured pitch, e.g., $$\Pi_{new} = \Pi_{old} + \frac{\Delta R_{hf} - \Delta R_{hr}}{L}$$

in which $\Pi_{new}$ is the updated pitch, $\Pi_{old}$ is the previous pitch, L is a constant for the vehicle 32 that is already known, and $\Delta R_{hf}$ and $\Delta R_{hr}$ are known from the first data from the sensors 50. The second pitch is the vehicle pitch with one of the axles 36, 40 freely rotatable after the trigger, and the computer 30 may determine the second pitch based on the second data in the same manner as the first pitch.

Next, in a block 460, the computer 30 calculates the vehicle weight based on the data. For example, the weight of the vehicle 32 may be the sum of a previously determined weight of the vehicle 32 and the weight of the mass m, e.g., $$W = W_{base} + mg$$

in which $W_{base}$ is the previously determined weight of the vehicle 32. The mass m may be determined by solving for the kinematics of the vehicle 32, e.g., as shown in FIG. 3, while one of the first and second brakes 34, 38 is applied. For example, the following system of equations can be derived from the kinematic diagram of FIG. 3:

$$F_{cf} = 0$$

$$\Delta F_{cr} = mg\sin(\theta)$$

$$mg\cos(\theta) = \Delta N_f + \Delta N_r$$

$$\Delta N_f L + mg\sin(\theta)h = mg\cos(\theta)L_r$$

$$\Delta N_f P_{lf}\sin(\alpha + \Delta\alpha) = \Delta\alpha K_f$$

$$\Delta F_{cr} P_{lr}\cos(\beta + \Delta\beta) + \Delta\beta K_r = \Delta N_r P_{lr}\sin(\beta + \Delta\beta)$$

$$\Delta R_{hf} = P_{lf}\Delta\alpha\sin\left(\alpha + \frac{\Delta\alpha}{2}\right)$$

$$\Delta R_{hr} = P_{lr}\Delta\beta\sin\left(\beta + \frac{\Delta\beta}{2}\right)$$

This system of equations is provided by way of example. The system of equations is determined by the geometry of the suspension system 58, as is known, and which may differ from vehicle to vehicle. If the pitches $\Pi_{new}$, $\Pi_{old}$ can be measured directly in the block 455 above, then the equation discussed above with respect to the block 455 can be used to determine one of the ride heights $\Delta R_{hf}$, $\Delta R_{hr}$, which can eliminate the need for the ride-height sensors 50 on one of the axles 36, 40. Because the first brake 34 is released when the first data is generated, the frictional force $F_{cf}$ at the front wheel 52 is zero, which eliminates a variable when solving the system of equations. From the system of equations, the mass m may be determined, e.g., $$m = \frac{\left(\frac{\Delta\alpha K_f}{P_{lf}\sin(\alpha + \Delta\alpha)}\right) \cdot \tan(\theta)P_{lr}\cos(\beta + \Delta\beta) + \Delta\beta K_r}{P_{lr}\sin(\beta + \Delta\beta) - \tan(\theta)P_{lr}\cos(\beta + \Delta\beta)} + \frac{\Delta\alpha K_f}{P_{lf}\sin(\alpha + \Delta\alpha)}}{g\cos(\theta)}$$

in which $P_{lf}$, $P_{lr}$, $K_f$, and $K_r$ are constants for the vehicle 32 that are already known; and $\alpha$, $\Delta\alpha$, $\beta$, $\Delta\beta$, and $\theta$ are known from the first and second data from the sensors 50, e.g., determined from the ride-height sensors 50.

Next, in a block 465, the computer 30 calculates a longitudinal center of gravity CG of the vehicle 32. For the purposes of this disclosure, the "longitudinal center of gravity" is defined as the point along the length of the vehicle 32 around which the resultant torque due to gravity vanishes, e.g., as shown in FIG. 3. For example, if cargo is put in a rear of the vehicle 32, the center of gravity CG of the vehicle 32 shifts rearward. The longitudinal center of gravity CG may be determined by a mass-weighted average of the longitudinal center of gravity of the vehicle 32 before adding the mass m and the longitudinal location $L_r$ of the mass m.

$$L_{CG} = \frac{L_{CG\_old}W_{base} + mgL_r}{W}$$

in which $L_{CG\_old}$ is the previous longitudinal distance of the center of gravity from the second axle 40. The longitudinal location $L_r$ of the mass m may be determined using the kinematic system of equations described with respect to the block 480 and solving for $L_r$, e.g., $$L_r = \frac{\Delta N_f L + mg \sin(\theta) h}{mg \cos(\theta)}$$

for which $$\Delta N_f = \frac{\Delta \alpha K_f}{P_{lf} \sin(\alpha + \Delta \alpha)}$$

in which L, $K_f$, and $P_{lf}$ are constants for the vehicle 32 that are already known; m is known from the block 480; $\alpha$, $\Delta \alpha$, and $\theta$ are known from the first and second data from the sensors 50, e.g., determined from the ride-height sensors 50; and h is a prestored value for a height at which cargo is typically placed.

Next, in a block 470, the computer 30 operates the vehicle 32, e.g., operates the propulsion 42, the brake system 44, and the steering system 46, based on the second pitch, the weight, and the longitudinal center of gravity CG. For example, the computer 30 may steer the vehicle 32, i.e., instruct the steering system 46, based on the second pitch, the weight, and the longitudinal center of gravity CG, such as by using a wider turning radius for a steeper pitch, a heavier weight, or a more rearward center of gravity, in order to increase occupant comfort, e.g., $$R = K(a\Pi + bW + cL_r)v^2$$

in which K, a, b, and c are constants determined by testing the vehicle 32 under various loading conditions, and v is the speed of the vehicle. For another example, the computer 30 may select relative braking forces for the first brake 34 and the second brake 38 based on the second pitch or the longitudinal center of gravity CG, e.g., applying a higher relative braking force for the first brake 34 compared to the second brake 38 when the vehicle 32 is pitched downward toward the first axle 36 or the longitudinal center of gravity CG is shifted toward the first axle 36, e.g., $$\frac{F_{b1}}{F_{b2}} = -K\Pi(L - L_r)$$

in which $F_{b1}$ and $F_{b2}$ are the braking forces of the first brake 34 and the second brake 38, respectively, and K is a constant determined by testing the vehicle 32 under various loading conditions. For another example, the computer 30 may operate the propulsion 42 based on the weight, e.g., adjusting an expected acceleration according to the weight, which for a heavier weight may lead the computer 30 to wait for a longer window before pulling into traffic in order to accommodate slower acceleration, e.g., $$x_{left} = KWv_{left}$$

in which $x_{left}$ is the minimum distance of a vehicle approaching from the left while the vehicle 32 is waiting to make an unprotected right turn, K is a constant determined by testing the vehicle 32 under various loading conditions, and $v_{left}$ is the speed of the vehicle approaching from the left. For another example, the computer 30 may operate the brake system 44 based on the weight, e.g., braking earlier and/or harder for a heavier weight, e.g., $$x_{stop} = KW$$

in which $x_{stop}$ is a minimum stopping distance of the vehicle 32 used by the autonomous-driving algorithm, and K is a constant determined by testing the vehicle 32 under various loading conditions. After the block 490, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first," "second," "third," and "fourth" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor, and a memory storing instructions executable by the processor to:
   determine at least one of a vehicle pitch or a longitudinal center of gravity from data measured while deactivating a first brake for a first axle and simultaneously applying a second brake for a second axle; and
   operate the vehicle based on the at least one of vehicle pitch or longitudinal center of gravity.

2. The computer of claim 1, wherein the instructions further include to determine a vehicle weight from the data, and operate the vehicle based on the vehicle weight.

3. The computer of claim 1, wherein the instructions further include to determine the vehicle pitch and the longitudinal center of gravity from the data, and operate the vehicle based on the vehicle pitch and the longitudinal center of gravity.

4. The computer of claim 1, wherein operating the vehicle based on the at least one of vehicle pitch or longitudinal center of gravity includes steering the vehicle.

5. The computer of claim 1, wherein operating the vehicle based on the at least one of vehicle pitch or longitudinal center of gravity includes selecting relative braking forces for the first brake and the second brake to apply.

6. The computer of claim 1, wherein measuring the data occurs in response to the vehicle stopping.

7. The computer of claim 1, wherein the data are second data, and the instructions further include to:
   measure first data while deactivating the first brake and simultaneously applying the second brake;
   then apply the first brake before measuring the second data; and
   then determine the at least one of vehicle pitch or longitudinal center of gravity from the first data and the second data.

8. The computer of claim 7, wherein measuring the second data occurs in response to detecting a vehicle pitch change above a threshold.

9. The computer of claim 7, wherein measuring the second data occurs in response to detecting at least one of a vehicle door closing or a vehicle seatbelt buckling.

10. A method comprising:
    determining at least one of a vehicle pitch or a longitudinal center of gravity from data measured while deactivating a first brake for a first axle and simultaneously applying a second brake for a second axle; and
    operating the vehicle based on the at least one of vehicle pitch or longitudinal center of gravity.

11. The method of claim 10, further comprising determining a vehicle weight from the data, and operating the vehicle based on the vehicle weight.

12. The method of claim 10, further comprising determining the vehicle pitch and the longitudinal center of gravity from the data, and operating the vehicle based on the vehicle pitch and the longitudinal center of gravity.

13. The method of claim 10, wherein operating the vehicle based on the at least one of vehicle pitch or longitudinal center of gravity includes steering the vehicle.

14. The method of claim 10, wherein operating the vehicle based on the at least one of vehicle pitch or longitudinal center of gravity includes selecting relative braking forces for the first brake and the second brake to apply.

15. The method of claim 10, wherein measuring the data occurs in response to the vehicle stopping.

16. The method of claim 10, wherein the data are second data, the method further comprising:
   measuring first data while deactivating the first brake and simultaneously applying the second brake;
   then applying the first brake before measuring the second data; and
   then determining the at least one of vehicle pitch or longitudinal center of gravity from the first data and the second data.

17. The method of claim 16, wherein measuring the second data occurs in response to detecting a vehicle pitch change above a threshold.

18. The method of claim 16, wherein measuring the second data occurs in response to detecting at least one of a vehicle door closing or a vehicle seatbelt buckling.

* * * * *